United States Patent
Osawa et al.

(10) Patent No.: US 6,642,920 B2
(45) Date of Patent: Nov. 4, 2003

(54) KEY INPUT DEVICE AND PORTABLE TELEPHONE INCORPORATING SAME

(75) Inventors: Nobuaki Osawa, Daito (JP); Tetsuya Miyazaki, Higashiosaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 135 days.

(21) Appl. No.: 09/825,292

(22) Filed: Apr. 4, 2001

(65) Prior Publication Data

US 2001/0033270 A1 Oct. 25, 2001

(30) Foreign Application Priority Data

Apr. 7, 2000 (JP) ........................................ 2000-106139

(51) Int. Cl.[7] ................................................ G09G 5/00
(52) U.S. Cl. ........................ 345/169; 345/168; 345/172; 345/160; 341/22
(58) Field of Search ................................ 345/168, 169, 345/172, 160; 341/22

(56) References Cited

U.S. PATENT DOCUMENTS 5,900,829 A * 5/1999 Gardner et al. ................ 341/26
5,924,555 A * 7/1999 Sadamori et al. ............ 200/512
6,172,620 B1 * 1/2001 Brick et al. .................... 341/22
6,307,537 B1 * 10/2001 Oowada ...................... 345/160

\* cited by examiner

Primary Examiner—Matthew C. Bella
Assistant Examiner—Tam Tran
(74) Attorney, Agent, or Firm—Armstrong, Westerman & Hattori, LLP.

(57) ABSTRACT

A key input device embodying the present invention comprises a seesaw switch unit (4) installed on a sheet (41), and a key rubber (8) installed on the sheet (41) covering the seesaw switch unit (4). A seesaw key (10) is arranged on the surface of the key rubber (8) for depressing the seesaw switch unit (4). The seesaw switch unit (4) comprises a base plate, a dome sheet provided on a base plate having a plurality of dome portions, and a pivotally movable member 6 provided over the dome sheet to depress selectively each dome portion. The depression of the pivotally movable member 6 causes a dome portion to be elastically restorably invertable, to have a contact terminal formed on an inner surface of the dome portion into contact with a contact electrode formed on a surface of the base plate, closing contacts. With the key input device, the device can be made thinner, and the complete waterproof can be achieved with reduced number of components.

8 Claims, 5 Drawing Sheets

KEY INPUT DEVICE AND PORTABLE TELEPHONE INCORPORATING SAME

FIELD OF THE INVENTION

The present invention relates to key input devices for use in portable telephones and the like, and more particularly to a seesaw key input device adapted to selectively close a plurality of key contacts.

BACKGROUND OF THE INVENTION

With reference to FIG. 4, portable telephones usually have a casing 1 formed by a front case 11 and a rear case 12. Arranged on the surface of the front case 11 are a display 13, a plurality of manual keys 14 including numerical keys, and a seesaw key 15 to be manipulated in selecting a desired function. The illustrated seesaw key 15 is depressed downwardly or is inclined to forward, back, left, or right, so that one of five key contacts is adapted to selectively be closed, with the result that one desired function is selected and set.

The casing 1 has a circuit board 3 disposed in its interior as shown in FIG. 5. Arranged on the circuit board 3 are a sheet key assembly 40 to be depressed by the manual keys 14 and the seesaw key 15, a display 13, a high-frequency circuit module 32, and a vibrator 2 comprising a motor 22 and an eccentric weight 21 attached to the output shaft of the motor for notifying the user of incoming calls, etc.

The sheet key assembly 40, as already known, has a dome sheet of PET comprising a plurality of dome portions disposed over a base plate. The dome portion is elastically restorably invertable by depressing force of the manual key to bring a contact terminal formed on the inner surface of the dome portion into contact with a contact electrode formed on the surface of the base plate to close contacts.

As shown in FIG. 6, arranged below the seesaw key 15 is a seesaw key assembly 9 having a stick 90 extended. The seesaw key assembly 9 is fixed to the surface of the dome sheet 41 forming a surface portion of the sheet key assembly 40. An end portion of the stick 90 of the seesaw key assembly 9 is fixed jointly to the rear surface of the seesaw key 15. As described above, the seesaw key 15 is manipulated into being depressed to depress the stick 90 downwardly, or is inclined to forward, back, left, or right, whereby a contact out of five contacts which is incorporated in the seesaw key assembly 9 can be closed.

A key rubber 80 is provided on the surface of the dome sheet 41 constituting the sheet key assembly 40, and covers a plurality of dome portions (not shown) formed with the sheet key assembly 40. The key rubber 80 is provided with an opening 80a on a region wherein the seesaw key assembly 9 is to be installed, and the seesaw key assembly 9 is installed in the opening, whereby the seesaw key assembly 9 has its rear surface contacted with the surface of the dome sheet 41, and is surface-mounted on the dome sheet 41.

An annular waterproof member 91 is interposed between the outer peripheral surface of the seesaw key assembly 9 and the inner peripheral surface of the opening 80a of the key rubber 80. Accordingly, water ingressing from its surroundings can be prevented from reaching the surface of the dome sheet 41.

However, with the conventional portable telephone having a stick-like seesaw key assembly 9 installed, as shown in FIG. 6, the stick 90 needs to have some height since the inclination of the stick 90 causes the seesaw key assembly 9 to close the terminals, thus entailing the problem of increasing the thickness of the portable telephone. Due to the waterproof construction of interposing the waterproof member 91 between the seesaw key assembly 9 and the key rubber 80, the waterproof member is required, increasing the number of components. Further, there is likelihood that water may ingress from between the seesaw key assembly 9 and the waterproof member 91, or from between the key rubber 80 and the waterproof member 91, giving rise to another problem of insufficient waterproof.

SUMMARY OF THE INVENTION

An object of the present invention is to provide a key input device which is adapted to make the device more thinner and to make the device waterproofed completely with reduced number of components, and a portable telephone incorporating the key input device.

The key input device of the present invention comprises a seesaw switch unit 4 mounted on a base, and a key rubber 8 installed on the base covering the seesaw switch unit 4. Provided on the surface of the key rubber 8 is a seesaw key 10 to depress the seesaw switch unit 4.

The seesaw switch unit 4 comprises a base plate 5, a dome sheet 7 provided over the base plate 5 having a plurality of dome portions 71, 72, a pivotally movable member 6 provided over the dome sheet 7 to selectively depress each dome portion 71. The seesaw key 10 is installed over the pivotally movable member 6. The pivotally movable member 6 is depressed by the manipulation of the seesaw key 10 to make a dome portion elastically restorably invertable to bring a contact terminal 52 provided on the inner surface of the dome portion into contact with a contact electrode 51 provided on the surface of the base plate 5, with the result that the contacts are closed.

With the key input device of the invention, the seesaw switch unit 4 is used in place of a conventional stick-like seesaw key device 9. The seesaw switch unit 4 can be made thinner, so that the entire device is adapted to be made thinner. Further, since the seesaw switch unit 4 is adapted to close its contacts by exerting a depressing force on the pivotally movable member 6, the seesaw switch unit 4 installed directly on the surface of the base is covered with the key rubber 8 having no opening, and the depression of the seesaw key 10 provided on the surface of the key rubber 8 activates the seesaw switch unit 4. Accordingly, the key rubber has no opening as in the prior art, so that the complete waterproof construction is achieved and there is no need of the conventional waterproof member.

Stated specifically, the key rubber 8 comprises a flat plate portion 82 affixed to the rear surface of the seesaw key 10, a slanting portion 83 formed by defining the flat plate portion 82, a grounding portion 84 formed by defining the slanting portion 83. The slanting portion 83 is so inclined from the flat plate portion 82 to the grounding portion 84 as to be positioned at a lower level toward the base, and the grounding portion 84 is in close contact with the surface of the base.

Stated more specifically, when the seesaw key 10 is depressed to move the pivotally movable member 6, the flat plate portion 82 of the key rubber 8 is depressed by the rear surface of the seesaw key 10 to have the flat plate portion 82 inclined, having the slanting portion 83 of the key rubber 8 elastically deformed. The slanting portion 83 is inclined toward the grounding portion 84, so that the slanting portion 83 can be elastically deformed spontaneously, and the portion is deformed in a relatively small amount. Therefore, even if the key rubber 8 is repeatedly stressed by the repeated manipulation of the seesaw key 10, there is no likelihood of cracking, etc. on the key rubber 8.

Further stated specifically, the central portion of the rear surface of the seesaw key 10 and the central portion of the surface of the flat plate portion 82 are affixed to each other. The seesaw key 10 contacts with the flat plate portion 82 of the key rubber 8 so as to be relatively movable each other around the affixed portion.

Further stated more specifically, when the seesaw key 10 is depressed to move the pivotally movable member 6, the flat plate portion 82 of the key rubber 8 is depressed by the rear surface of the seesaw key 10 to have the flat plate portion 82 inclined and to have the slanting portion 83 elastically deformed. While the seesaw key 10 and the flat plate portion of the key rubber 8 are affixed only at each central portion thereof, the surrounding portion is not affixed and is relatively movable. This has the slanting portion 83 elastically deformed more freely.

The portable telephone of the invention comprises the key input device of the invention described in place of the conventional key input device having a stick-like seesaw key device, that is, disposed inside the casing 1 are a circuit board 3 formed with a circuit for radio communication, a sheet key assembly 40 installed on the circuit board 3, a seesaw switch unit 4 installed on the surface of the sheet key assembly 40, a key rubber 8 provided covering the surface of the sheet key assembly 40 and the seesaw switch unit 4, and arranged on the surface on the key rubber 8 are a plurality of manual keys 14 for depressing the sheet key assembly 40, and a seesaw key 10 for depressing the seesaw switch unit 4.

The seesaw switch unit 4 comprises a base plate 5, a dome sheet having a plurality of dome portions 71, 72 provided over the base plate 5, a pivotally movable member 6 provided over the dome sheet 7 to depress each dome portion 71 selectively. The seesaw key 10 is provided over the pivotally movable member 6. The pivotally movable member 6 is depressed by the manipulation of the seesaw key 10 to make one dome portion elastically restorably invertable to bring a contact terminal 52 formed on the inner surface of the dome portion into contact with a contact electrode 51 formed on the surface of the base plate 5 to close the contacts.

As described above, the key input device of the invention and the portable telephone having the device are adapted to be made thinner and waterproofed completely with the reduced number of the components.

DETAILED DESCRIPTION OF EMBODIMENTS

Figure 4:
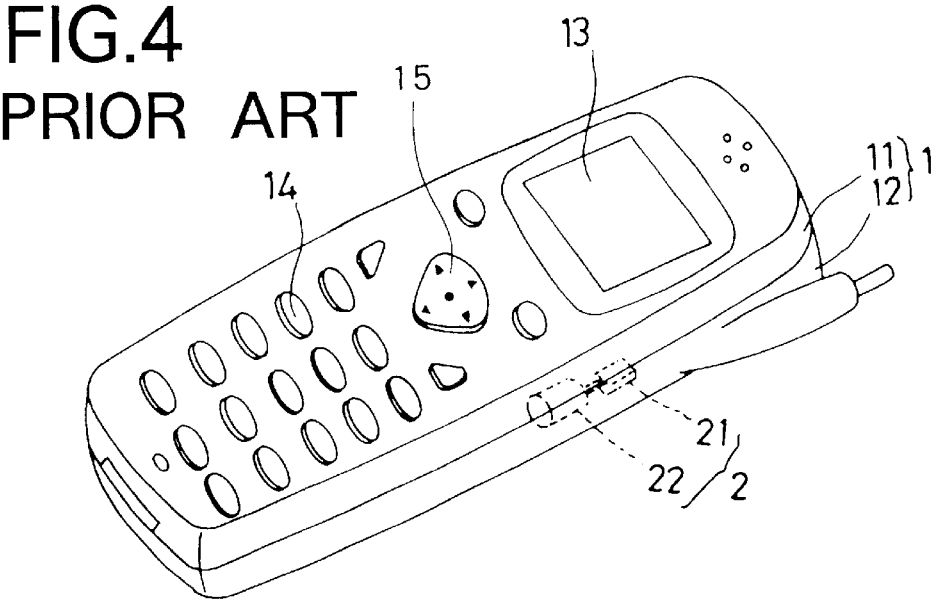
FIG. 4 is a perspective view showing the conventional portable telephone.
Figure 5:
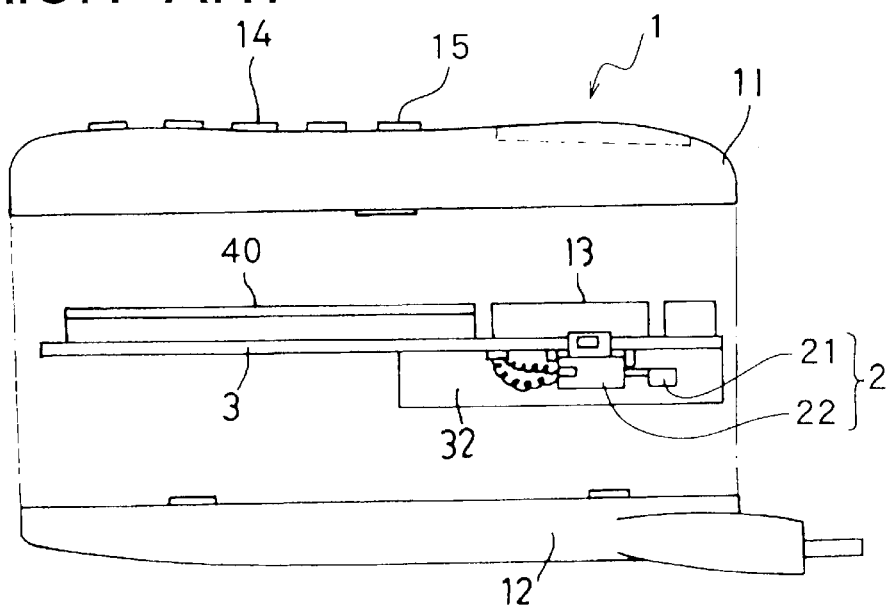
FIG. 5 is an exploded side elevation of the portable telephone.
Figure 6:
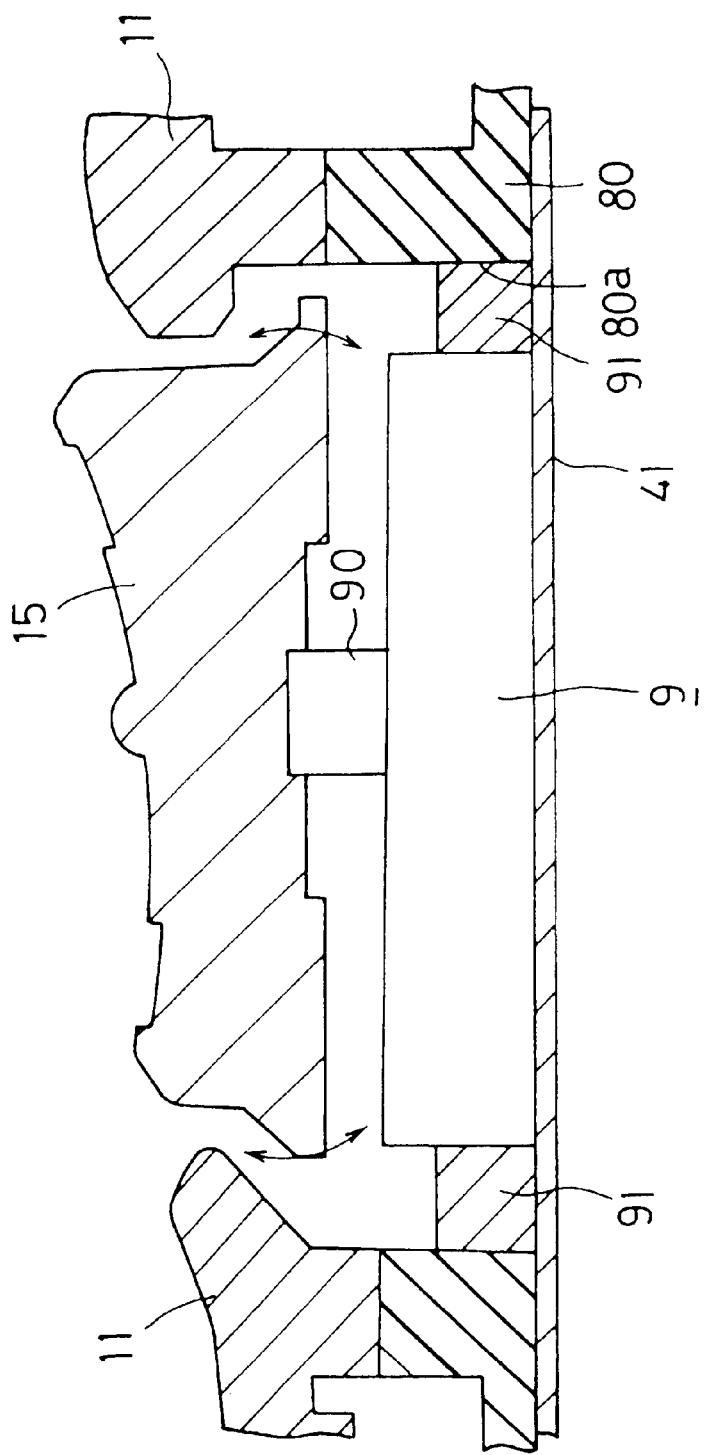
FIG. 6 is an enlarged view in section showing a seesaw key portion provided to the conventional portable telephone.

A detailed description will be given below of the present invention as embodied for the portable telephone shown in FIG. 4 and FIG. 5.

Figure 3:
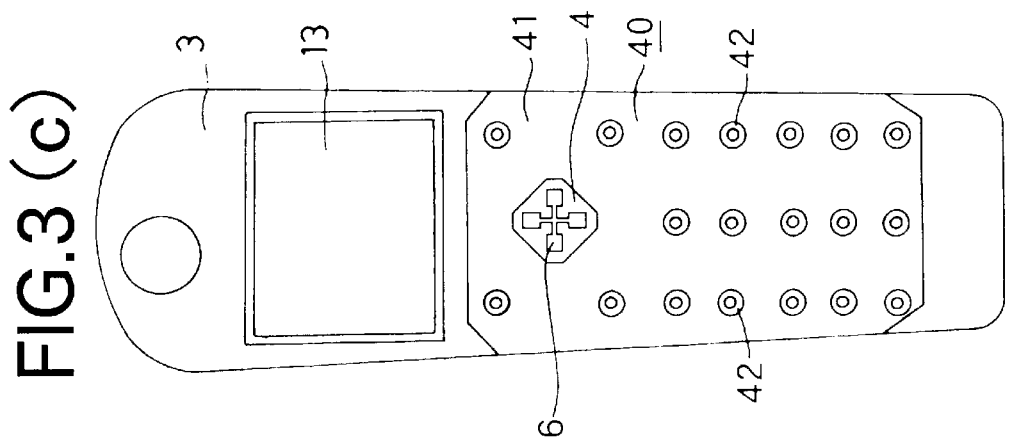
FIGS. 3(a), 3(b), and 3(c) are plan views showing a front case, a key rubber, and a circuit board, respectively.
Figure 3:
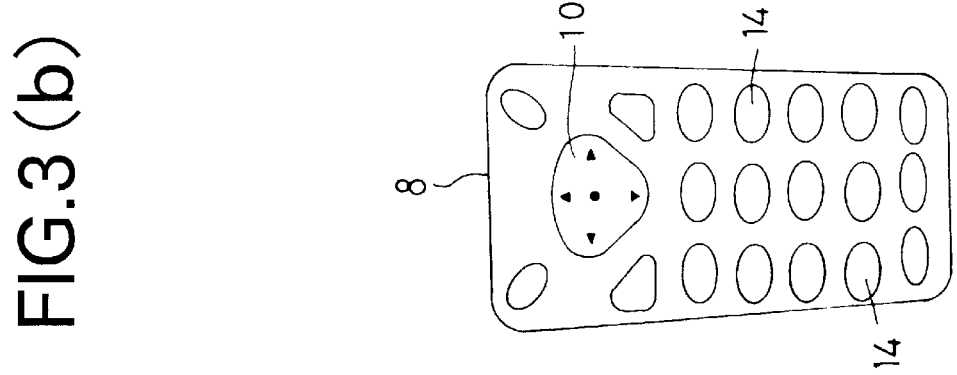
Figure 3:
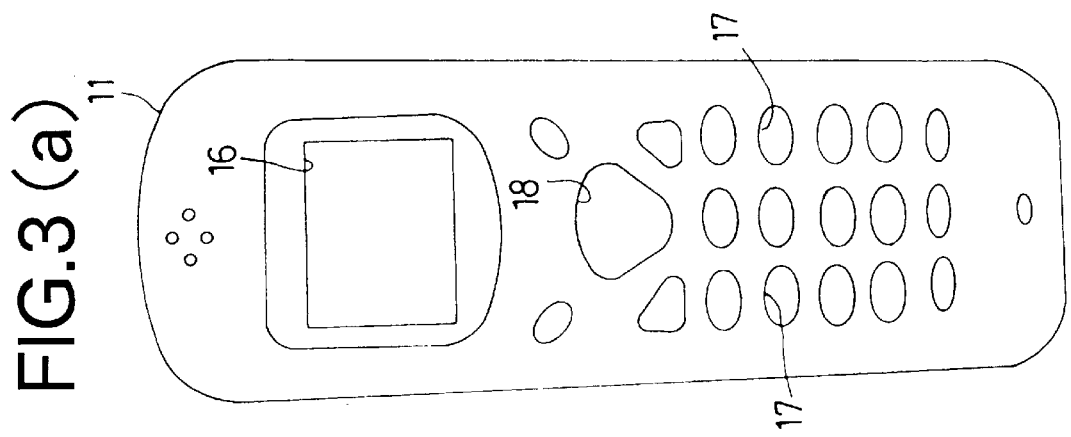

With the portable telephone of the present invention, the front case 11 constituting its casing is formed with an opening 16 for exposing the display 13, and a plurality of openings 17 for causing the manual keys 14 to project therethrough, and an opening 18 for causing the seesaw key 10 to project therethrough, as shown in FIG. 3(a), FIG. 3(b), and FIG. 3(c). Arranged inside the front case 11 is a key rubber 8 of silicon rubber having a plurality of manual keys 14 and a seesaw key 10 formed integrally therewith. The seesaw key 10 is designed for selectively closing one contact out of five contacts, selecting and setting one desired function by depressing manipulation and pivotally moving manipulation.

The circuit board 3 to be disposed within the casing is provided thereon with the display 13 and a key sheet assembly 40 having a plurality of dome portions 42. Mounted on the surface of the sheet key assembly 40 is a seesaw switch unit 4 away from the dome portion 42 to be depressed by the seesaw key 10.

Figure 2:
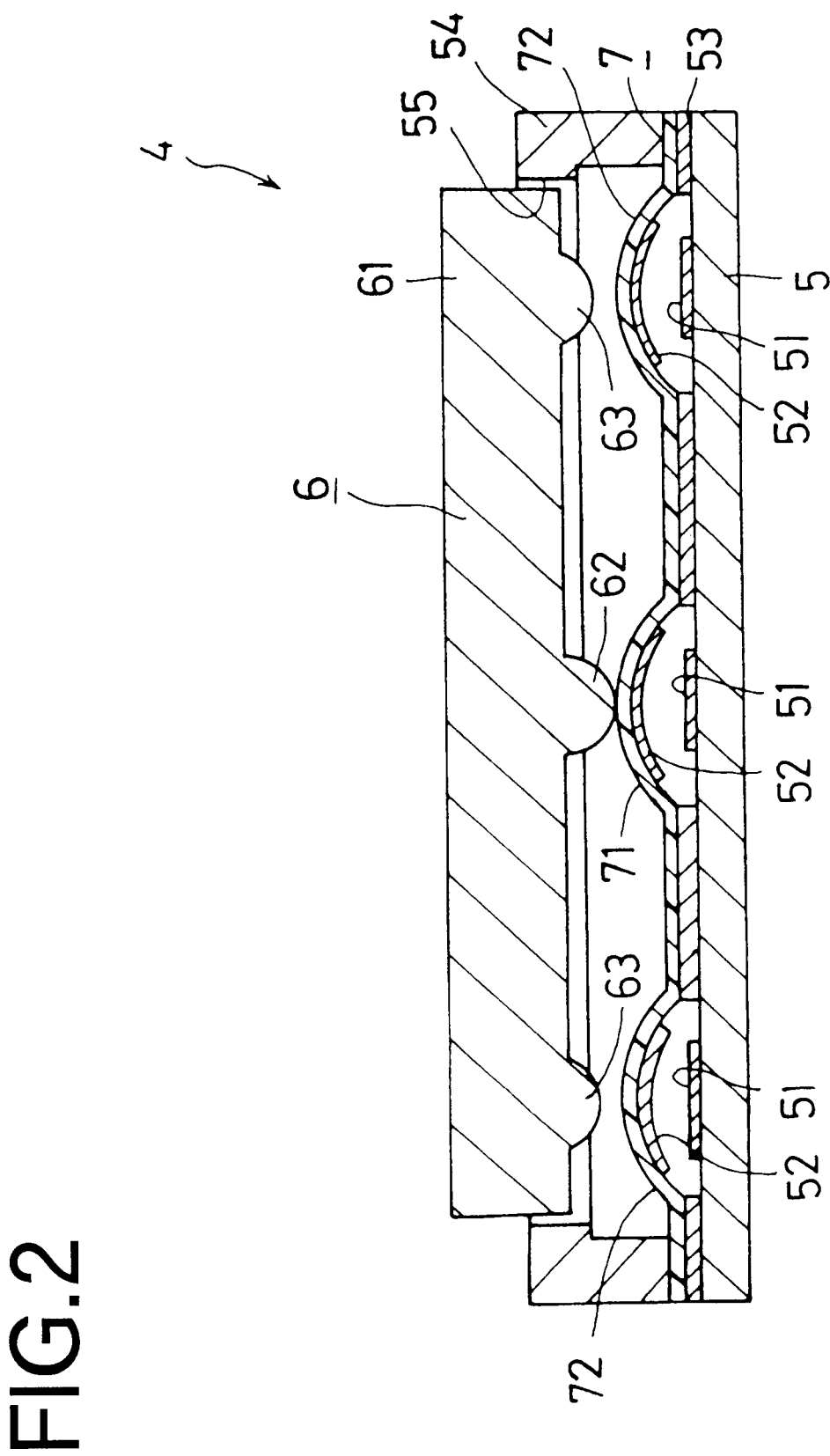
FIG. 2 is an enlarged view in section a seesaw key switch unit disposed on the key input device.

The seesaw switch unit 4 comprises, as shown in FIG. 2, a spacer sheet 53 and a dome sheet 7 of PET joined to each another and provided over a base plate 5, a cover plate 54 covering the sheets 53, 7 as fixed, a pivotally movable member 6 provided on an opening 55 formed with the cover plate 54. The dome sheet 7 comprises a central dome portion 71 and four surrounding dome portions 72. A contact terminal 52 in the form of a circular carbon film is provided on the inner surface of each dome portion 71, 72.

On the other hand, a contact electrode 51 is formed on the surface of the base plate 5 in corresponding relation with each dome portion 71, 72 of the dome sheet 7. The contact terminal 52 formed on the inner surface of each dome portion 71, 72 of the dome sheet 7 contacts with the contact electrode 51 on the base plate 5, to cause the contacts to be closed.

The pivotally movable member 6 has a cross-shaped body 61. A projection 62, 63 is formed on the rear surface of the cross-shaped body 61 in corresponding to each dome portion 71, 72 of the dome sheet 7. The pivotally movable member 6 is depressed downwardly to cause a projection 62 positioned centrally to depress the dome portion 71 positioned below, having the dome portion 71 inverted. Further, the pivotally movable member 6 is moved toward one direction to cause a projection 63 positioned on an outer periphery to depress the dome portion 72 positioned below, having the dome portion 72 inverted. The cross-shaped body 61 of the pivotally movable member 6 is engaged with an end portion of the cover plate 54 (not shown) for preventing the member from slipping off.

Figure 1:
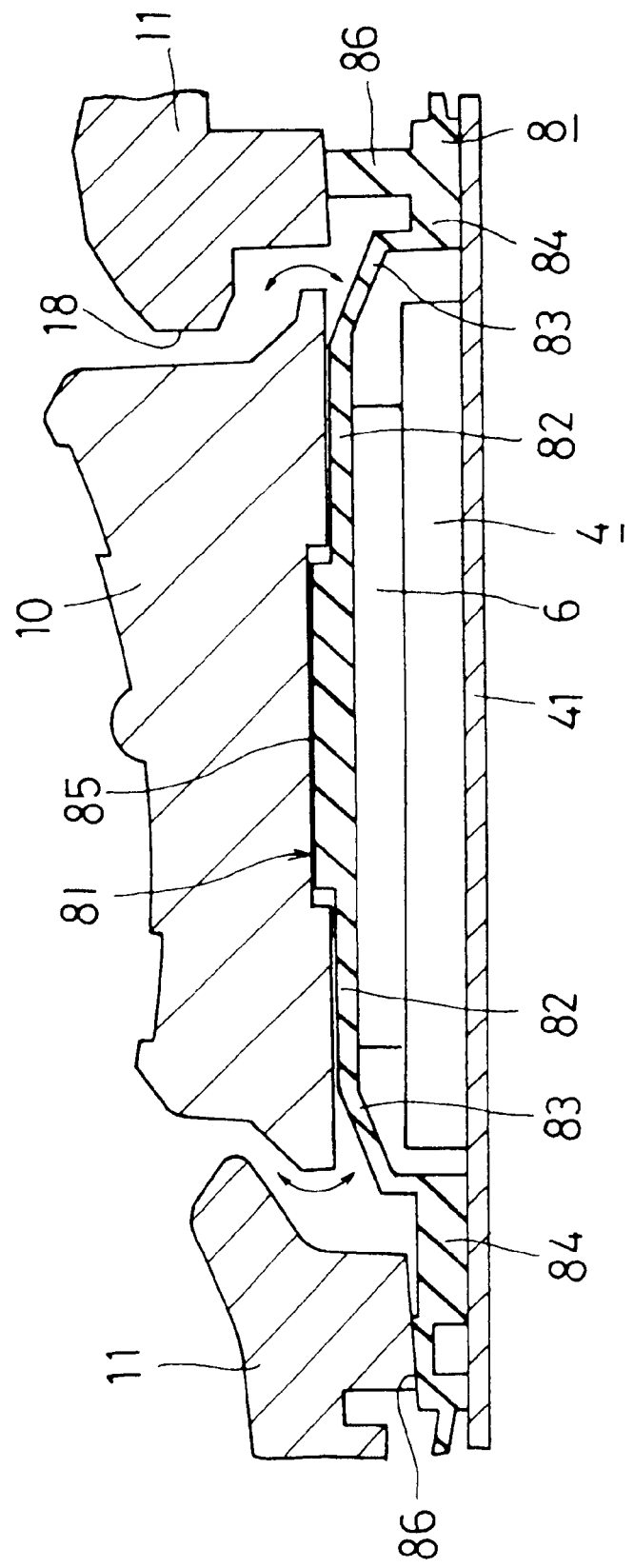
FIG. 1 is an enlarged view in section showing a key input device embodying the invention.

With respect to FIG. 1, the seesaw switch unit 4 is mounted on the surface of the dome sheet 41 constituting the sheet key assembly 40, and is joined with solder to a land portion (not shown) formed on the surface of the dome sheet 41. The key rubber 8 is provided on the dome sheet 41 covering the seesaw switch unit 4, with no opening provided as in the prior art. The key rubber 8 comprises a flat plate portion 82 covering the pivotally movable member 6 of the seesaw switch unit 4, a slanting portion 83 formed by defining the flat plate portion 82, a grounding portion 84 formed by defining the slanting portion 83, an annular rib portion 86 projecting upwardly on the grounding portion 84.

The slanting portion 83 of the key rubber 8 is so inclined from the flat plate portion 82 to the grounding portion 84 as to be positioned at a lower level toward the dome sheet 41. The grounding portion 84 of the key rubber 8 is in close contact with the surface of the dome sheet 41, and the rib portion 86 is in close contact with the rear surface of the front case 11. The seesaw key 10 is installed on the surface of the flat plate portion 82 of the key rubber 8. A central portion 81 of the surface of the flat plate portion 82 and a central portion of the rear surface of the seesaw key 10 are bonded to each other by an adhesive 85. The head of the seesaw key 10 projects outwardly from the opening 18 provided on the front case 11.

With the portable telephone described, when one desired function is selected from among the five functions shown on the display 13, the seesaw key 10 is depressed downwardly or is depressed into either of forward, back, left, or right direction in corresponding to the position at which the function to be selected is shown, to be inclined in an oblique direction.

When the seesaw key 10 is depressed downwardly, for example, the depressing force of the seesaw key 10 is passed on to the central portion of the pivotally movable member 6 of the seesaw switch unit 4 through the key rubber 8, to cause the projection 62 positioned centrally at the pivotally movable member 6 to depress the dome portion 72 below the projection, having the dome portion 72 inverted to close the contacts. In this process, an outer peripheral portion of the flat plate portion 82 of the key rubber 8 relatively moves freely to the seesaw key 10 at a surface wherein the peripheral portion contacts with the seesaw key 10, to have the slanting portion 83 elastically deformed with ease, and the displacement of the seesaw key 10 is spontaneously passed on to the pivotally movable member 6 of the seesaw switch unit 4.

The seesaw key 10 is depressed into either of directions to have the key inclined, whereby the depressing force of the seesaw key 10 is passed on to the end portion of the pivotally movable member 6 of the seesaw switch unit 4 through the key rubber 8, moving the pivotally movable member 6 into one direction, causing one projection 63 positioned at an outer periphery of the pivotally movable member 6 to depress the dome portion 72 below the projection, to have the dome portion 72 inverted, which closes the contacts. In this process, an outer peripheral portion of the flat plate portion 82 of the key rubber 8 relatively moves freely to the seesaw key 10 at a surface wherein the peripheral portion contacts with the seesaw key 10, to have the slanting portion 83 elastically deformed with ease, and the displacement of the seesaw key 10 is spontaneously passed on to the pivotally movable member 6 of the seesaw switch unit 4.

The seesaw switch unit 4 is used in the portable telephone described in place of the conventional stick-like seesaw key assembly 9. The seesaw switch unit 4 is so constructed as to be thin as shown in FIG. 2, whereby the casing 1 is made compact.

With respect to FIG. 1, since the seesaw switch unit 4 is surface-mounted on the dome sheet 41 being covered with the key rubber 8 having no opening, even if water ingresses from the surrounding of the seesaw key 10, the water is prevented from ingressing by the key rubber 8, so that the water will never reach the surface of the dome sheet 41.

Further, there is no need of the conventional waterproof member 91 due to the waterproof construction of the key rubber 8, whereby the number of components is reduced.

The device of the present invention is not limited to the foregoing embodiment in construction but can be modified variously by one skilled in the art without departing from the spirit of the invention as set forth in the appended claims. Furthermore, the key input device embodying the present invention is not limited only to portable telephones but can be applied to various electronic apparatus such as video game players, etc.

What is claimed is:

1. A key input device comprising a seesaw switch unit (4) mounted on a base, and a key rubber (8) provided on the base covering the seesaw switch unit (4), a seesaw key (10) provided on the surface of the key rubber (8) for depressing the seesaw switch unit (4), the seesaw switch unit (4) comprising a base plate (5), a dome sheet (7) provided on the base plate (5) and having a plurality of dome portions (71)(72), and a pivotally movable member (6) with a plurality of projectors provided over the dome sheet (7) to selectively depress each dome portion (71), the seesaw key (10) disposed over the pivotally movable member (6), a dome portion being elastically restorably invertable by being depressed by the pivotally movable member (6) to bring a dome-shaped contact terminal (52) formed on an inner surface of the dome portion into contact with a contact electrode (51) formed on a surface of the base plate (5) and closing contacts;

wherein one of the plurality of projectors is larger than all others of said plurality of projectors so as to provide an seesawing effect for the seesaw switch unit 4.

2. A key input device according to claim 1 wherein the base is a sheet key assembly (40) having a plurality of manual keys, and the seesaw switch unit (4) is surface-mounted on the surface of a sheet (41) forming a surface layer portion of the sheet key assembly (40).

3. A key input device according to claim 1 wherein the key rubber (8) comprises a flat plate portion (82) affixed to the rear surface of the seesaw key (10), a slanting portion (83) formed by defining the flat plate portion (82), and a grounding portion (84) formed by defining the slanting portion (83), and the slanting portion (83) is so inclined from the flat plate portion (82) to the grounding portion (84) as to be positioned at a lower level toward the base, and the grounding portion (84) is in close contact with the surface of the base.

4. A key input device according to claim 3 wherein the central portion of the rear surface of the seesaw key (10) and the central portion (81) of the surface of the flat plate portion (82) of the key rubber (8) are affixed to each other, and the seesaw key (10) and the flat plate portion (82) of the key rubber (8) are contacted so as to be relatively movable each other around the affixed portion.

5. A portable telephone comprising a circuit board (3) disposed inside a casing (1) and formed with a circuit for radio communication, a sheet key assembly (40) installed on the circuit board (3), a seesaw switch unit (4) installed on the surface of the sheet key assembly (40), a key rubber (8) provided covering the surface of the sheet key assembly (40) and the seesaw switch unit (4), the key rubber (8) having arranged on its surface a plurality of manual keys (14) for depressing the sheet key assembly (40) and a seesaw key (10) for depressing the seesaw switch unit (4), the seesaw switch unit (4) comprising a base plate (5), a dome sheet (7) having a plurality of dome portions (71)(72) and provided over the base plate (5), and a pivotally movable member (6) with a plurality of projectors provided over the dome sheet (7) for selectively depressing each dome portion (71), the seesaw key (10) disposed over the pivotally movable member (6), a dome portion being elastically restorably invertable by being depressed by the pivotally movable member (6) to bring a dome-shaped contact terminal (52) formed on an inner surface of the dome portion into contact with a contact electrode (51) formed on the surface of the base plate (5) and closing contacts;

wherein one of the plurality of projectors is larger than all others of said plurality of projectors so as to provide an seesawing effect for the seesaw switch unit 4.

6. A portable telephone according to claim 5 wherein the seesaw switch unit (4) is surface-mounted on the sheet key assembly (40).

7. A portable telephone according to claim 5 wherein the key rubber (8) comprises a flat plate portion (82) affixed to the rear surface of the seesaw key (10), a slanting portion (83) formed by defining the flat plate portion (82), and a grounding portion (84) formed by defining the slanting portion (83), and the slanting portion (83) is so inclined from the flat plate portion (82) to the grounding portion (84) as to be positioned at a lower level toward the sheet key assembly (40), and the grounding portion (84) is in close contact with the surface of the sheet key assembly (40).

8. A portable telephone according to claim 7 wherein the central portion of the rear surface of the seesaw key (10) and the central portion (81) of the surface of the flat plate portion (82) of the key rubber (8) are affixed to each other, and the seesaw key (10) and the flat plate portion (82) of the key rubber (8) are contacted so as to be relatively movable each other around the affixed portion.

\* \* \* \* \*